United States Patent
Liao et al.

(10) Patent No.: US 8,319,444 B2
(45) Date of Patent: Nov. 27, 2012

(54) TAIL-LESS LED CONTROL CIRCUIT

(75) Inventors: Chiawei Liao, San Jose, CA (US);
Jing-Meng Liu, Zhubei (TW);
Leng-Nien Hsiu, Zhubei (TW)

(73) Assignee: Richtek Technology Corporation, R.O.C., Hsinchu (TW)

( * ) Notice: Subject to any disclaimer, the term of this patent is extended or adjusted under 35 U.S.C. 154(b) by 287 days.

(21) Appl. No.: 12/787,599

(22) Filed: May 26, 2010

(65) Prior Publication Data
US 2010/0301761 A1 Dec. 2, 2010

Related U.S. Application Data

(60) Provisional application No. 61/183,380, filed on Jun. 2, 2009.

(51) Int. Cl.
*H05B 37/00* (2006.01)

(52) U.S. Cl. ........................ 315/186; 315/193; 315/224

(58) Field of Classification Search ............ 315/185 R, 315/186, 193, 224–226, 291, 294, 297, 307, 315/312
See application file for complete search history.

(56) References Cited

U.S. PATENT DOCUMENTS

| | | | |
|---|---|---|---|
| 7,898,187 B1 * | 3/2011 | Mei et al. ................. | 315/247 |
| 2009/0179575 A1 * | 7/2009 | Mednik et al. ............ | 315/193 |
| 2010/0289424 A1 * | 11/2010 | Chang et al. ............. | 315/250 |
| 2011/0248640 A1 * | 10/2011 | Welten .................... | 315/210 |

* cited by examiner

*Primary Examiner* — Tung X Le
(74) *Attorney, Agent, or Firm* — Tung & Associates

(57) ABSTRACT

The present invention discloses a tail-less LED control circuit, which includes: a power supply stage having an output terminal which provides electrical power to an LED circuit; an output capacitor coupled to the output terminal; an LED driver circuit coupled to the power supply stage for controlling the power supply stage to provide the electrical power to the LED circuit, the LED driver circuit receiving a PWM dimming signal for adjusting brightness of the LED circuit; and a MOSFET switch coupled to the output capacitor in series, the MOSFET switch switching synchronously with the PWM dimming signal to alleviate LED afterglow, wherein the MOSFET switch includes a body diode having an anode-cathode direction against the discharge direction of the output capacitor.

6 Claims, 4 Drawing Sheets

TAIL-LESS LED CONTROL CIRCUIT

CROSS REFERENCE

The present invention claims priority to U.S. provisional application No. 61/183,380, filed on Jun. 2, 2009.

BACKGROUND OF THE INVENTION

1. Field of Invention

The present invention relates to a tail-less light emitting diode (LED) control circuit; particularly, it relates to a tail-less LED control circuit which connects and disconnects an output capacitor in synchronization with a pulse width modulation (PWM) dimming signal, to alleviate LED afterglow (tail).

2. Description of Related Art

FIG. 1 shows a schematic circuit diagram of a conventional LED control circuit. As shown in FIG. 1, an LED driver circuit 10 controls the inductor current in a power supply stage 60 via a switching signal pin SW, such that the power supply stage 60 provides electrical power to an LED circuit 30. The LED driver circuit 10 receives a PWM dimming signal 20; depending on different designs, such PWM dimming signal 20 may be received via an enable pin EN, a digital control pin DCTL, or an analog control pin ACTL. The LED driver circuit 10 turns ON/OFF the LED circuit 30 according to the PWM dimming signal 20, whereby the brightness of the LED circuit 30 is adjusted according to the duty ratio of the PWM dimming signal 20.

The aforementioned prior art has the following drawbacks. When the LED circuit 30 is turned OFF, due to the residual charges in the output capacitor Cout, the LEDs are still powered for a short while; that is, the LEDs will still shine for a short while after they have been turned OFF, which is an undesired "afterglow" or "tail". And since the output capacitor Cout is discharged during the OFF period, it will need to be re-charged to the appropriate voltage level in the next cycle, requiring more settling time. Thus, the actual brightness of the LED circuit 30 does not exactly follow the duty ratio of the PWM dimming signal 20, resulting in low dimming contrast and reducing the effectiveness of the PWM dimming signal 20.

In view of the foregoing, the present invention provides a tail-less LED control circuit which connects and disconnects the output capacitor in synchronization with a pulse width modulation (PWM) dimming signal, to alleviating the foregoing problems. The present invention does not need a complicated circuit, so there is no area penalty.

SUMMARY OF THE INVENTION

The objective of the present invention is to provide a tail-less LED control circuit.

To achieve the objective mentioned above, the present invention provides a tail-less LED control circuit. The tail-less LED control circuit comprises: a power supply stage having an output terminal which provides electrical power to an LED circuit; an output capacitor coupled to the output terminal; an LED driver circuit coupled to the power supply stage for controlling the power supply stage to provide the electrical power to the LED circuit, the LED driver circuit receiving a PWM dimming signal for adjusting brightness of the LED circuit; and a MOSFET switch coupled to the output capacitor in series, the MOSFET switch switching synchronously with the PWM dimming signal to alleviate LED afterglow.

When the PWM dimming signal turns OFF the LED circuit during its low state period (referred to as "PWM low period"), the present invention also turns OFF the MOSFET switch to isolate the output capacitor, such that the output capacitor Cout is not discharged via the LED circuit; thus, the LEDs are turned OFF sharply (tail-less). In this PWM low period, only the magnetizing current of the inductor will light up the LED for a very short while. As the inductor magnetizing current reaches zero, the LED stays off for the rest of the PWM low period. Therefore, a high contrast PWM dimming can be achieved by the added MOSFET switch. And since the output capacitor Cout is not discharged during the OFF period, the appropriate voltage level is well kept across the output capacitor Cout. Thus, no re-charging process is required and there is no settling time issue in the next cycle.

The aforementioned MOSFET switch can be provided external to or integrated in the LED driver circuit.

The MOSFET switch may be a P-type metal oxide semiconductor field effect transistor (PMOSFET) or an N-type metal oxide semiconductor field effect transistor (NMOSFET). An MOSFET inherently includes a body diode (parasitic diode). Preferably, the body diode of the MOSFET has an anode-cathode direction against the discharge direction of the output capacitor Cout, such that when the MOSFET is turned OFF, the output capacitor Cout is not discharged through the parasitic diode of the MOSFET.

The aforementioned LED circuit may include one or multiple LED strings, and each LED string may include one or more LEDs.

By the present invention, higher dimming contrast, or tail-less ON/OFF, can be achieved in an existing low dimming contrast circuit with the use of an MOSFET of the present invention.

The present invention is applicable to buck, boost, buck-boost, inverting, and flyback power converters.

The objectives, technical details, features, and effects of the present invention will be better understood with regard to the detailed description of the embodiments below.

DESCRIPTION OF THE PREFERRED EMBODIMENTS

Figure 1:
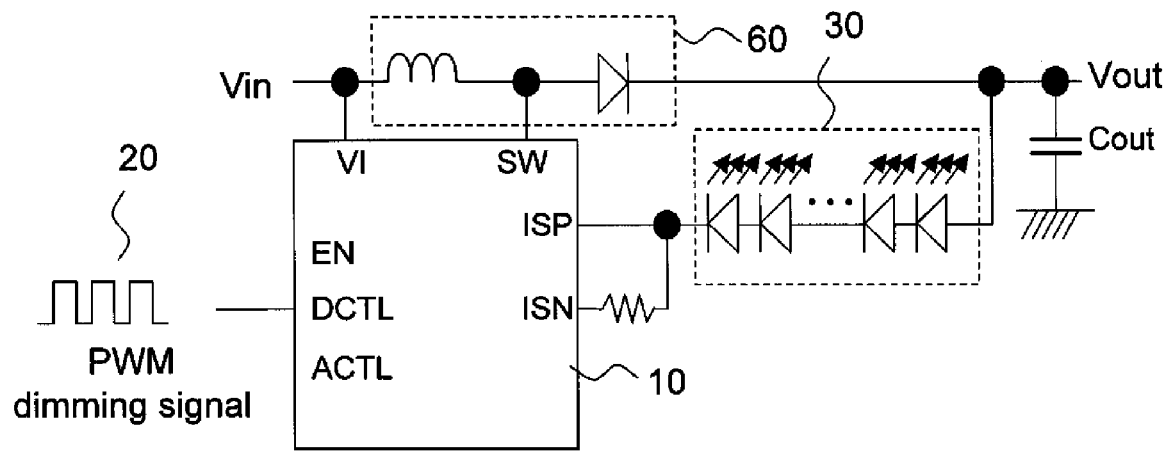
FIG. 1 illustrates a schematic circuit diagram showing an LED driver circuit, an LED circuit, and a power supply stage in a prior art LED control circuit.
Figure 2:
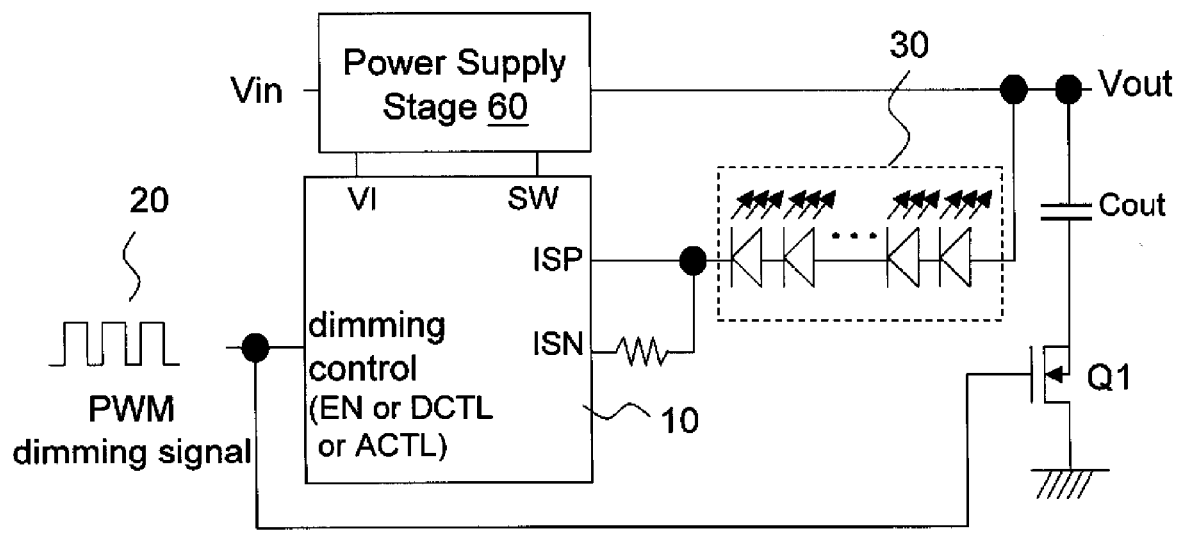
FIG. 2 illustrates an embodiment of the present invention.
Figure 3A:
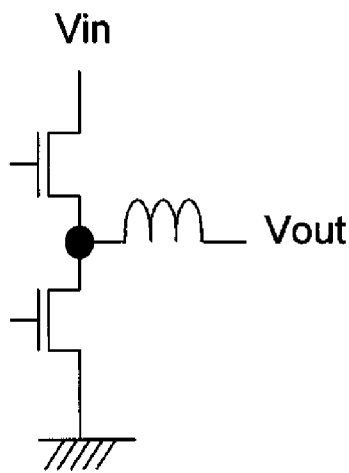
FIG. 3A-3G illustrates several examples of the power supply stage.
Figure 3B:
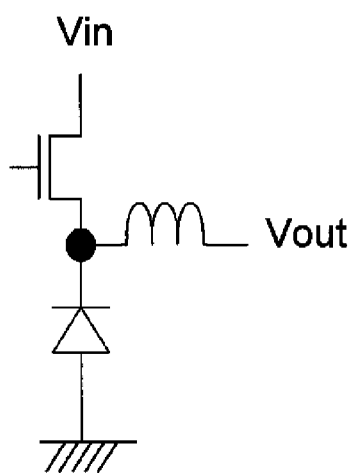
Figure 3C:
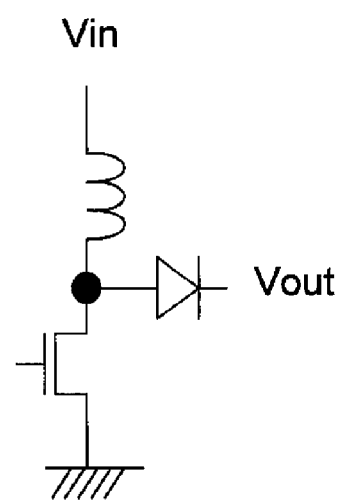
Figure 3D:
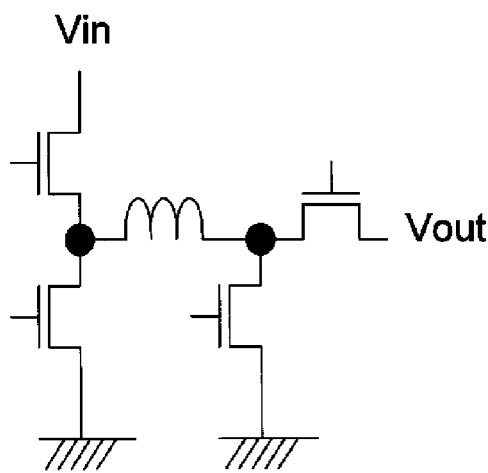
Figure 3E:
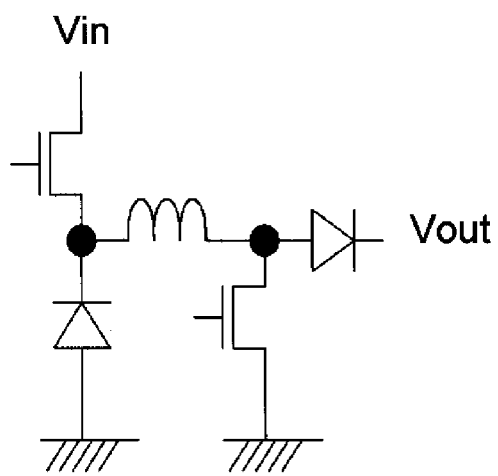
Figure 3F:
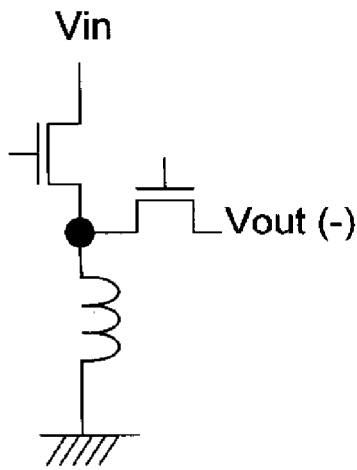
Figure 3G:
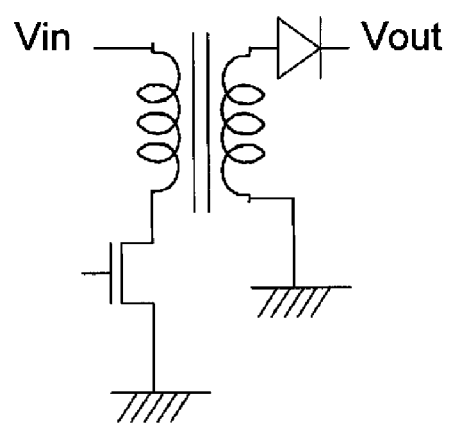

FIG. 2 shows a first embodiment of the present invention. An LED driver circuit 10 controls a power supply stage circuit 60 to convert an input voltage Vin to an output voltage Vout, which is supplied to an LED circuit 30. The power stage circuit 60 can be (but not limited to) anyone of buck, boost, buck-boost, inverter, and flyback power converters shown in FIGS. 3A-3G. In some cases, the power transistors in FIGS. 3A-3G are integrated into the circuit 10; in other cases, the power transistors are outside of the circuit 10. Referring to FIG. 2, the LED driver circuit 10 receives a PWM dimming signal 20 and turns ON/OFF the LED circuit 30 accordingly to adjust the brightness of the LED circuit 30. The PWM dimming signal 20 may be received via a proper pin provided in the LED driver circuit 10, such as an enable pin EN, a digital control pin DCTL, or an analog control pin ACTL.

The present invention is characterized by a MOSFET switch connected with the output capacitor Cout in series; in this embodiment it is an NMOSFET Q1 connected between the output capacitor Cout and ground. The MOSFET switch Q1 switches in synchronization with the PWM dimming signal 20. During PWM low period, the output capacitor Cout is disconnected from ground, such that the output capacitor Cout is not discharged via the LED circuit 30. Therefore, The LEDs are turned OFF sharply (tail-less). In the PWM low period, only the magnetizing current of the inductor will light up the LEDs for a very short while. As the inductor magnetizing current reaches zero, the LEDs stay off for the rest of the PWM low period. High contrast PWM dimming can now be achieved. Note that, to prevent the output capacitor Cout from discharging via the body diode of the MOSFET switch Q1 when the MOSFET switch Q1 is OFF, the MOSFET is preferably connected in reverse, that is, the MOSFET is connected in such a way that the body diode of the MOSFET has an anode-cathode direction against the discharge direction of the output capacitor Cout.

Figure 4:
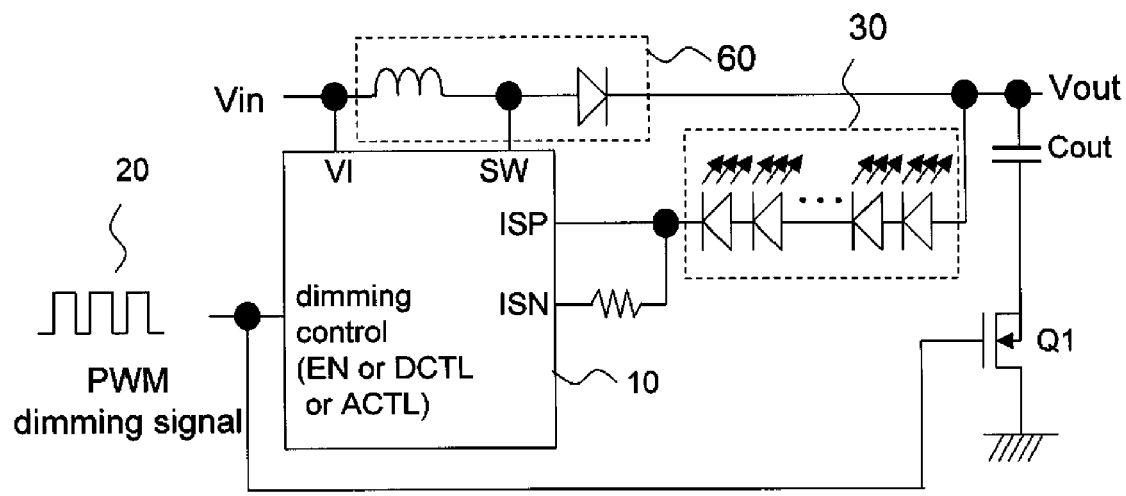
FIG. 4-6 shows three other embodiments of the present invention.

FIG. 4 shows another embodiment of the present invention. In this embodiment, the power supply stage 60 is a power converter shown in FIG. 3C which performs boost or buck-boost power conversion, and the power switch of the power converter is integrated into the LED driver circuit 10. When the negative current sensing pin ISN is coupled to ground, the power supply stage 60 performs boost power conversion, and when the pin ISN is coupled to the pin VI, the power supply stage 60 performs buck-boost power conversion. The LED circuit 30 has a positive terminal which is coupled to the power supply stage 60, and a negative terminal which is directly connected to the positive current sensing pin ISP, and furthermore, the negative terminal is also connected with a resistor in series and the other end of the resistor is connected to the pin ISN. The voltage across the resistor provides a current sensing signal indicating the current through the LED circuit 30. During the PWM low period, the output capacitor Cout is disconnected from ground, so the charges therein are not released via the LED circuit 30. Thus, the LEDs are turned OFF sharply (tail-less).

Figure 5:
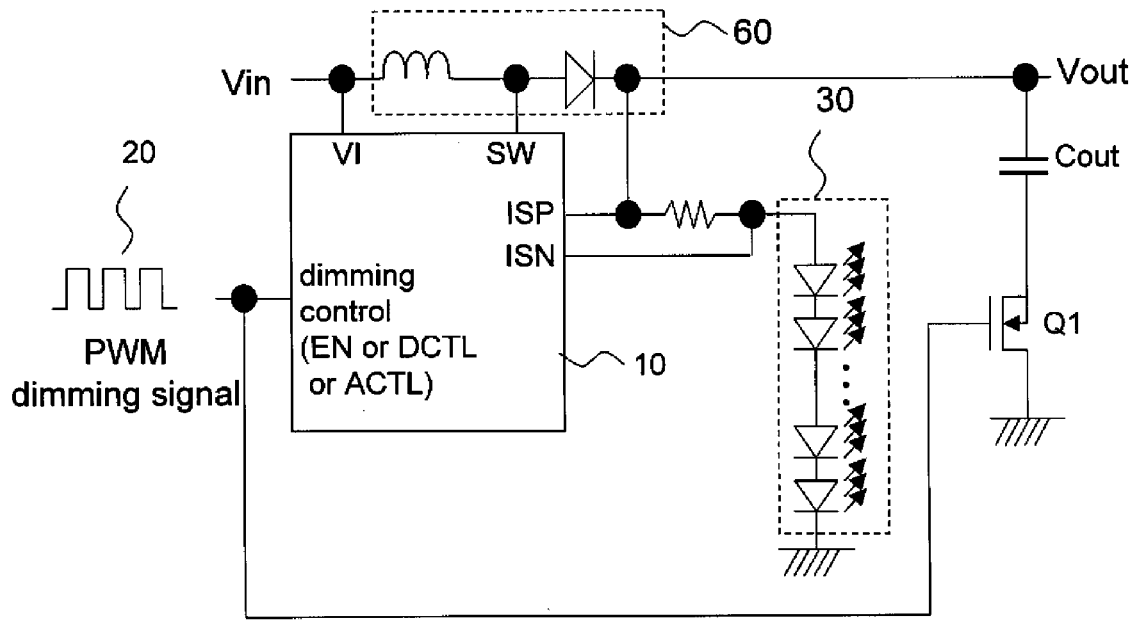

FIG. 5 shows yet another embodiment of the present invention. Different from the embodiment shown in FIG. 4, this embodiment senses current through the LED circuit 30 from its positive terminal. As shown in the figure, the negative terminal of the LED circuit 30 is coupled to ground; the positive terminal of the LED circuit 30 is directly connected to the pin ISN, and the positive terminal is also connected with a resistor in series and the other end of the resistor is connected to the pin ISP. The voltage across the resistor provides a current sensing signal indicating the current through the LED circuit 30. During the PWM low period, the output capacitor Cout is disconnected from ground, so the charges are not released via the LED circuit 30. Thus, the LEDs are turned OFF sharply (tail-less).

Figure 6:
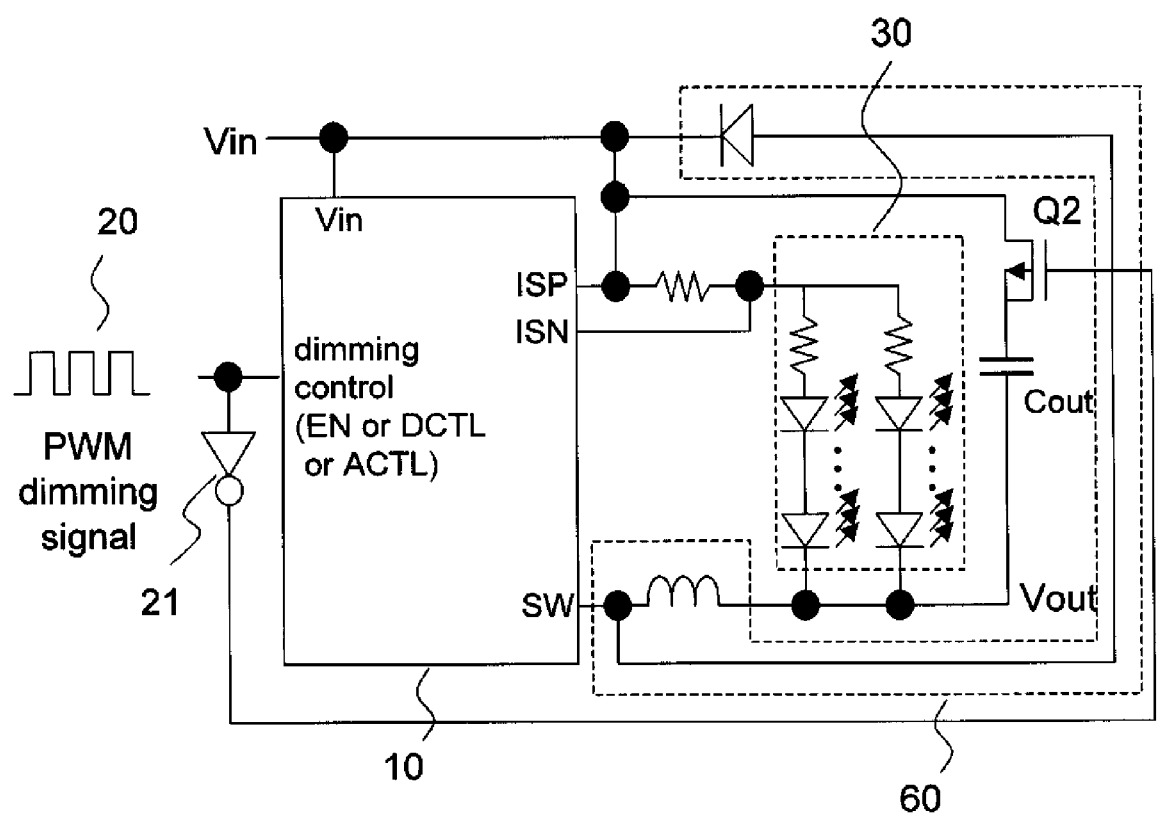

FIG. 6 shows a buck power conversion embodiment of the present invention. In this embodiment, the LED circuit 30 is coupled between the output voltage Vout and the input voltage Vin. Because the voltage across the LED circuit 30 is about equal to Vin-Vout (the small voltage loss across the current sensing resistor may be neglected), the power supply stage 60 can be operated by a switch coupled between the pin SW and ground, to provide electrical power to the LED circuit 30 in buck mode.

In this embodiment, the MOSFET switch Q2 is a PMOSFET coupled between the output capacitor Cout and the input voltage Vin. The MOSFET switch Q2 is preferably connected in reverse such that the body diode of the MOSFET switch Q2 has an anode-cathode direction against the discharge direction of the output capacitor Cout. During the PWM low period, the MOSFET switch Q2 is turned OFF, and the output capacitor Cout is disconnected from the input voltage Vin, so the output capacitor Cout is not discharged. Thus, the LEDs are turned OFF sharply (tail-less). Preferably, the inverter 21 in the figure also provides a level shift function so that its output voltage level is able to correctly operate the MOSFET switch Q2. Alternatively, the MOSFET switch Q2 may be located between the output capacitor Cout and the inductor.

In the above, FIG. 6 shows an embodiment wherein the LED circuit 30 includes multiple LED strings, and FIGS. 4 and 5 show embodiments wherein the LED circuit 30 includes one single LED string. The present invention is not limited to such arrangement. The LED circuit 30 of FIG. 6 may include only one LED string, and the LED circuits 30 of FIGS. 4 and 5 may include multiple LED strings. That is, in the present invention, the LED circuit 30 may include one or multiple LED strings. When the LED circuit 30 includes multiple LED strings, the LED strings can be arranged in an array form, wherein each LED string includes one or more LEDs.

The key point of the present invention is to provide a MOSFET switch coupled to the output capacitor Gout in series, and when the PWM dimming signal 20 turns OFF the LED circuit 30, the MOSFET switch is synchronously turned OFF. The rest of the circuit, such as the power supply stage 60, and the connection of the LED circuit 30, may be modified in various ways. Such modifications and variations should be interpreted to fall within the scope of the present invention. Moreover, in all the above embodiments, the MOSFET switches Q1 and Q2 directly receive the PWM dimming signal 20 or its inverted signal. But the present invention is not limited to this. It is only necessary for the MOSFET switches Q1 and Q2 to switch synchronous with the PWM dimming signal 20; the MOSFET switches Q1 and Q2 do not have to be controlled by the PWM dimming signal 20 itself (or its inverted signal). For example, when the MOSFET switch Q1 or Q2 is integrated with the LED driver circuit 10 in an integrated circuit, the MOSFET switch Q1 or Q2 can be controlled by a signal duplicated from the PWM dimming signal 20 within the integrated circuit, instead of the PWM dimming signal 20 itself.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, in FIGS. 2, 4 and 5, the switch Q1 is located between the capacitor and ground, but the switch Q1 can certainly be located between the capacitor and the output node Vout; similarly, in FIG. 6, the switch Q2 can be located between the capacitor and the inductor. As other examples, the LED driver circuit 10 shown in the figures is a single integrated circuit, but it can be multiple separate circuits; the MOSFET switches Q1 and Q2 are shown outside of the LED driver circuit 10, but they may be located inside the LED driver circuit 10, integrated with the LED driver circuit 10 to become one integrated circuit; in the foregoing description, it is assumed that the PWM high period is ON and the PWM low period is OFF, but it can be reversely arranged so that the PWM low period is ON and the PWM high period is OFF (under such circumstance, the signals controlling the switches Q1 and Q2 may need to be inverted). In view of the foregoing, the spirit of the present invention should cover all such and other modifications and variations, which should be interpreted to fall within the scope of the following claims and their equivalents.

What is claimed is:

1. A tail-less LED control circuit, comprising:
   a power supply stage having an output terminal which provides electrical power to an LED circuit;
   an output capacitor coupled to the output terminal;
   an LED driver circuit coupled to the power supply stage for controlling the power supply stage to provide the electrical power to the LED circuit, the LED driver circuit receiving a PWM dimming signal for adjusting brightness of the LED circuit; and
   a MOSFET switch coupled to the output capacitor in series, the MOSFET switch switching synchronously with the PWM dimming signal, such that there is no substantial current through the LED circuit when the MOSFET switch is OFF to alleviate LED afterglow, wherein the MOSFET switch includes a body diode having an anode-cathode direction against a discharge direction of the output capacitor.

2. The tail-less LED control circuit of claim 1, wherein the MOSFET switch and the LED driver circuit are integrated into an integrated circuit.

3. The tail-less LED control circuit of claim 1, wherein the LED circuit is an LED array which includes at least one LED string, and each LED string includes at least one LED.

4. The tail-less LED control circuit of claim 1, wherein the MOSFET switch receives the PWM dimming signal or an inverted signal of the PWM dimming signal as a control signal.

5. The tail-less LED control circuit of claim 1, wherein the power supply stage is a buck, boost, buck-boost, inverting, or flyback power converter.

6. The tail-less LED control circuit of claim 1, wherein the power supply stage converts an input voltage to an output voltage, and the LED circuit is coupled between the input voltage and the output voltage.

* * * * *